United States Patent
Munsell et al.

(10) Patent No.: US 10,465,549 B2
(45) Date of Patent: Nov. 5, 2019

(54) GAS TURBINE ENGINE FORWARD BEARING COMPARTMENT ARCHITECTURE

(71) Applicant: UNITED TECHNOLOGIES CORPORATION, Farmington, CT (US)

(72) Inventors: Peter M. Munsell, Granby, CT (US); Philip S. Stripinis, Rocky Hill, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 109 days.

(21) Appl. No.: 15/865,393

(22) Filed: Jan. 9, 2018

(65) Prior Publication Data

US 2018/0149035 A1 May 31, 2018

Related U.S. Application Data

(63) Continuation of application No. 15/046,524, filed on Feb. 18, 2016, now Pat. No. 9,885,249, which is a
(Continued)

(51) Int. Cl.
*F01D 15/12* (2006.01)
*F01D 25/08* (2006.01)
(Continued)

(52) U.S. Cl.
CPC .............. *F01D 15/12* (2013.01); *F01D 5/06* (2013.01); *F01D 9/065* (2013.01); *F01D 25/08* (2013.01);
(Continued)

(58) Field of Classification Search
CPC . F01D 5/06; F01D 9/061; F01D 15/12; F01D 25/08; F01D 25/16; F01D 25/24;
(Continued)

(56) References Cited

U.S. PATENT DOCUMENTS 2,258,792 A   4/1941 New
2,680,001 A   6/1954 Batt
(Continued)

FOREIGN PATENT DOCUMENTS

EP   0791383   8/1997
EP   1142850   10/2001
(Continued)

OTHER PUBLICATIONS

Whitaker, R. (1982). ALF 502: plugging the turbofan gap. Flight International, p. 237-241, Jan. 30, 1982.
(Continued)

*Primary Examiner* — Igor Kershteyn
(74) *Attorney, Agent, or Firm* — Carlson, Gaskey & Olds, P.C.

(57) ABSTRACT

A gas turbine engine according to an example of the present disclosure includes, among other things, a fan, a low pressure compressor, and a high pressure compressor axially aft of the low pressure compressor. A first case structure defines a core flow path for core airflow into the low pressure compressor and has a forward end and an aft end. A second case structure defines a core flow path for core airflow into the high pressure compressor and is mounted to the aft end of the first case structure. A geared architecture is at least partially supported by the first case structure. A first bearing structure is mounted to the first case structure to rotationally support a fan shaft that connects with the geared architecture to drive the fan. A flex support provides a flexible attachment of the geared architecture within the first case structure. A
(Continued)

fan drive turbine drives the geared architecture to drive the fan at a speed lower than a speed of the fan drive turbine.

28 Claims, 5 Drawing Sheets

Related U.S. Application Data continuation of application No. 14/745,724, filed on Jun. 22, 2015, now Pat. No. 9,416,677, which is a continuation-in-part of application No. 14/640,251, filed on Mar. 6, 2015, now Pat. No. 9,410,483, which is a continuation of application No. 13/346,832, filed on Jan. 10, 2012, now Pat. No. 9,004,849.

(51) Int. Cl.

| | | |
|---|---|---|
| *F01D 25/16* | (2006.01) | |
| *F01D 25/24* | (2006.01) | |
| *F01D 5/06* | (2006.01) | |
| *F01D 9/06* | (2006.01) | |
| *F02C 6/08* | (2006.01) | |
| *F02C 7/36* | (2006.01) | |
| *F04D 29/32* | (2006.01) | |

(52) U.S. Cl.
CPC ............ *F01D 25/16* (2013.01); *F01D 25/24* (2013.01); *F02C 6/08* (2013.01); *F02C 7/36* (2013.01); *F04D 29/325* (2013.01); *F05D 2220/32* (2013.01); *F05D 2240/50* (2013.01); *F05D 2240/55* (2013.01); *F05D 2260/40311* (2013.01)

(58) Field of Classification Search
CPC .. F02C 6/08; F02C 7/36; F04D 29/325; F05D 2220/32; F05D 2240/50; F05D 2240/55; F05D 2260/40311
See application file for complete search history.

(56) References Cited

U.S. PATENT DOCUMENTS

| | | | |
|---|---|---|---|
| 2,756,561 A | | 7/1956 | Morley |
| 2,826,895 A | | 3/1958 | English |
| 2,936,655 A | | 5/1960 | Peterson et al. |
| 3,021,731 A | | 2/1962 | Stoeckicht |
| 3,194,487 A | | 7/1965 | Tyler et al. |
| 3,287,906 A | | 11/1966 | McCormick |
| 3,352,178 A | | 11/1967 | Lindgren et al. |
| 3,382,670 A | | 5/1968 | Venable |
| 3,412,560 A | | 11/1968 | Gaubatz |
| 3,747,343 A | | 7/1973 | Rosen |
| 3,754,484 A | | 8/1973 | Roberts |
| 3,820,719 A | | 6/1974 | Clark |
| 3,844,110 A | | 10/1974 | Widlansky et al. |
| 3,892,358 A | | 7/1975 | Gisslen |
| 3,932,058 A | | 1/1976 | Harner et al. |
| 3,935,558 A | | 1/1976 | Miller et al. |
| 3,988,889 A | | 11/1976 | Chamay et al. |
| 3,990,814 A | | 11/1976 | Leone |
| 4,130,872 A | | 12/1978 | Harloff |
| 4,284,174 A | | 8/1981 | Salvana et al. |
| 4,478,551 A | | 10/1984 | Honeycutt, Jr. et al. |
| 4,645,415 A | * | 2/1987 | Hovan ................. F01D 25/125 415/115 |
| 4,649,114 A | | 3/1987 | Miltenburger et al. |
| 4,696,156 A | | 9/1987 | Burr et al. |
| 4,979,362 A | | 12/1990 | Vershure, Jr. |
| 4,979,872 A | | 12/1990 | Myers et al. |
| 5,080,555 A | * | 1/1992 | Kempinger ............ F01D 9/065 415/108 |
| 5,102,379 A | | 4/1992 | Pagluica et al. |
| 5,141,400 A | | 8/1992 | Murphy et al. |
| 5,317,877 A | | 6/1994 | Stuart |
| 5,433,674 A | | 7/1995 | Sheridan et al. |
| 5,447,411 A | | 9/1995 | Curley et al. |
| 5,466,198 A | | 11/1995 | McKibbin et al. |
| 5,524,847 A | | 6/1996 | Brodell et al. |
| 5,677,060 A | | 10/1997 | Terentieva et al. |
| 5,778,659 A | | 7/1998 | Duesler et al. |
| 5,857,836 A | | 1/1999 | Stickler et al. |
| 5,915,917 A | | 6/1999 | Eveker et al. |
| 5,975,841 A | | 11/1999 | Lindemuth et al. |
| 5,985,470 A | | 11/1999 | Spitsberg et al. |
| 6,223,616 B1 | | 5/2001 | Sheridan |
| 6,315,815 B1 | | 11/2001 | Spadaccini et al. |
| 6,318,070 B1 | | 11/2001 | Rey et al. |
| 6,387,456 B1 | | 5/2002 | Eaton, Jr. et al. |
| 6,517,341 B1 | | 2/2003 | Brun et al. |
| 6,607,165 B1 | | 8/2003 | Manteiga et al. |
| 6,623,238 B2 | * | 9/2003 | Langston ................ F01D 11/00 415/112 |
| 6,709,492 B1 | | 3/2004 | Spadaccini et al. |
| 6,814,541 B2 | | 11/2004 | Evans et al. |
| 7,021,042 B2 | | 4/2006 | Law |
| 7,201,558 B2 | * | 4/2007 | Norris ................... F01D 11/005 415/110 |
| 7,328,580 B2 | | 2/2008 | Lee et al. |
| 7,374,403 B2 | | 5/2008 | Decker et al. |
| 7,383,686 B2 | * | 6/2008 | Aycock ................. F01D 9/065 60/39.511 |
| 7,591,754 B2 | | 9/2009 | Duong et al. |
| 7,662,059 B2 | | 2/2010 | McCune |
| 7,806,651 B2 | | 10/2010 | Kennepohl et al. |
| 7,824,305 B2 | | 11/2010 | Duong et al. |
| 7,926,260 B2 | | 4/2011 | Sheridan et al. |
| 7,997,868 B1 | | 8/2011 | Liang et al. |
| 8,205,432 B2 | | 6/2012 | Sheridan |
| 8,371,127 B2 | | 2/2013 | Durocher et al. |
| 2007/0084188 A1 | | 4/2007 | Orlando et al. |
| 2007/0193276 A1 | | 8/2007 | Corattiyil et al. |
| 2008/0003096 A1 | | 1/2008 | Kohli et al. |
| 2008/0116009 A1 | | 5/2008 | Sheridan et al. |
| 2008/0317588 A1 | | 12/2008 | Grabowski et al. |
| 2009/0056343 A1 | | 3/2009 | Suciu et al. |
| 2009/0081039 A1 | | 3/2009 | McCune et al. |
| 2010/0105516 A1 | | 4/2010 | Sheridan et al. |
| 2010/0148396 A1 | | 6/2010 | Xie et al. |
| 2010/0160105 A1 | | 6/2010 | Sheridan et al. |
| 2010/0212281 A1 | | 8/2010 | Sheridan |
| 2010/0218483 A1 | | 9/2010 | Smith |
| 2010/0331139 A1 | | 12/2010 | McCune |
| 2011/0159797 A1 | | 6/2011 | Beltman et al. |
| 2011/0293423 A1 | | 12/2011 | Bunker et al. |
| 2012/0124964 A1 | | 5/2012 | Hasel et al. |
| 2013/0177385 A1 | | 7/2013 | Munsell et al. |
| 2015/0096303 A1 | | 4/2015 | Schwarz |

FOREIGN PATENT DOCUMENTS

| | | |
|---|---|---|
| EP | 2213864 | 8/2010 |
| EP | 2362081 | 8/2011 |
| GB | 1516041 | 6/1978 |
| GB | 2041090 | 9/1980 |
| GB | 2426792 | 12/2006 |
| WO | 2007038674 | 4/2007 |

OTHER PUBLICATIONS

Munt, R. (1981). Aircraft technology assessment: Progress in low emissions engine. Technical Report. May 1981. pp. 1-171.

Waters, M.H. and Schairer, E.T. (1977). Analysis of turbofan propulsion system weight and dimensions. NASA Technical Memorandum. Jan. 1977. pp. 1-65.

Avco Lycoming Divison. ALF 502L Maintenance Manual. Apr. 1981. pp. 1-118.

Type Certificate Data Sheet No. E6NE. Department of Transportation Federal Aviation Administration. Jun. 7, 2002. pp. 1-10.

(56) References Cited

OTHER PUBLICATIONS

Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Honeywell TFE731-5AR to -5BR Engine Conversion Program. Sep. 2005. pp. 1-4.
Garret TFE731 Turbofan Engine (Cat C). Chapter 79: Lubrciation System. TTFE731 Issue 2. 2010. pp. 1-24.
McArdle, J.G. (1979). Static test-stand performance of the YF-102 turbofan engine with several exhaust configurations for the quiet short-haul research aircraft (QSRA). NASA Technical Paper. Nov. 1979. pp. 1-68.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.

(56) References Cited

OTHER PUBLICATIONS

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.N. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E, Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
The Extended European Search report for EP Application No. 12865495.1, dated Oct. 29, 2015.
The International Search Report and Written Opinion for PCT Application No. PCT/US2012/071827, dated Feb. 22, 2013.
International Preliminary Report on Patentability for PCT Application No. PCT/US2012/071827, dated Jul. 24, 2014.
The Extended European Search Report for EP Application No. 16174744.9, dated Nov. 8, 2016.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).

(56) References Cited

OTHER PUBLICATIONS

Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. ASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91, 2016.
Declaration of John Eaton, Ph.D. In re U.S. Pat. No. 8,869,568. Executed Mar. 28, 2016. pp. 1-87, 2016.
Declaration of Reza Abhari. In re U.S. Pat. No. 8,695,920. Executed Nov. 30. pp. 1-67, 2016.
Declaration of Reza Abhari. In re U.S. Pat. No. 8,448,895. Executed Nov. 28. pp. 1-81, 2016.
Declaration of Reza Abhari. In re U.S. Pat. No. 8,695,920, claims 1-4, 7-14, 17 and 19. Executed Nov. 29. pp. 1-102, 2016.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.

Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N. S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.

\* cited by examiner

GAS TURBINE ENGINE FORWARD BEARING COMPARTMENT ARCHITECTURE

RELATED APPLICATIONS

This application is a continuation of U.S. application Ser. No. 15/046,524, filed Feb. 18, 2016, which is a continuation of U.S. application Ser. No. 14/745,724, filed Jun. 22, 2015, which was a continuation-in-part of U.S. patent application Ser. No. 14/640,251, filed Mar. 6, 2015, which was a continuation of prior U.S. patent application Ser. No. 13/346,832, filed Jan. 10, 2012, now U.S. Pat. No. 9,004,849 the entirety of which is herein incorporated by reference.

BACKGROUND

The present disclosure relates to a gas turbine engine, and in particular, to a case structure therefor.

Geared turbofan architectures may utilize epicyclic reduction gearboxes with planetary or star gear trains for their compact design and efficient high gear reduction capabilities. The geared turbofan architecture de-couples a fan rotor from a low spool through the reduction gearbox which results in isolation of the forwardmost bearing compartment.

SUMMARY

In a featured embodiment, a gas turbine engine includes a front center body case structure. A geared architecture is at least partially supported by the front center body case structure. A bearing structure is mounted to the front center body case structure to rotationally support a shaft driven by the geared architecture. The shaft drives a fan. A bearing compartment passage structure is in communication with the bearing structure through the front center body case structure.

In another embodiment according to the previous embodiment, the bearing structure includes a seal.

In another embodiment according to any of the previous embodiments, the bearing structure includes a bearing.

In another embodiment according to any of the previous embodiments, the bearing compartment passage structure includes a hollow front center body strut.

In another embodiment according to any of the previous embodiments, the hollow front center body strut is in fluid communication with a fan rotor bearing support structure which at least partially supports the bearing structure.

In another embodiment according to any of the previous embodiments, further includes a conditioning device in communication with the bearing compartment passage structure.

In another embodiment according to any of the previous embodiments, the conditioning device is a heat exchanger.

In another embodiment according to any of the previous embodiments, the conditioning device is in communication with a high pressure compressor.

In another embodiment according to any of the previous embodiments, the high pressure compressor is axially downstream of the geared architecture.

In another embodiment according to any of the previous embodiments, the conditioning device is radially outboard of a low pressure compressor.

In another embodiment according to any of the previous embodiments, the low pressure compressor is downstream of the geared architecture.

In another embodiment according to any of the previous embodiments, the bearing structure is axially between the fan and the geared architecture.

In another embodiment according to any of the previous embodiments, the front center body case structure defines a core flow path for a core airflow.

In another embodiment according to any of the previous embodiments, there are three turbine rotors, with a most downstream of the three turbine rotors driving the geared architecture.

In another featured embodiment, the method of communicating a buffer supply air for a gas turbine engine includes communicating a buffer supply air across a core flow path, and communicating the buffer supply air through a hollow front center body strut of a front center body case structure which defines the core flow path, the hollow front center body strut within the core flow path.

In another embodiment according to the previous embodiment, further including communicating the buffer supply air to a bearing compartment forward of a geared architecture.

In another embodiment according to the previous embodiment, further including, communicating the buffer supply air through a conditioning device upstream of the hollow front center body strut.

In another embodiment according to the previous embodiment, further including, communicating the buffer supply air to a bearing structure mounted to a front center body case structure which defines the core flow path. The bearing structure rotationally supports a shaft driven by a geared architecture.

In another embodiment according to the previous embodiment, further including, driving a fan through the geared architecture. The bearing structure is axially located between the fan and the geared architecture.

In another featured embodiment, a method of communicating a buffer supply air for a gas turbine engine includes communicating a buffer supply air across a core flow path, communicating the buffer supply air to a bearing structure mounted to a front center body case structure which defines the core flow path, the bearing structure rotationally supporting a shaft driven by a geared architecture, driving a fan through the geared architecture, the bearing structure axially located between the fan and the geared architecture, and communicating the buffer supply air to a spinner supported by the fan.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
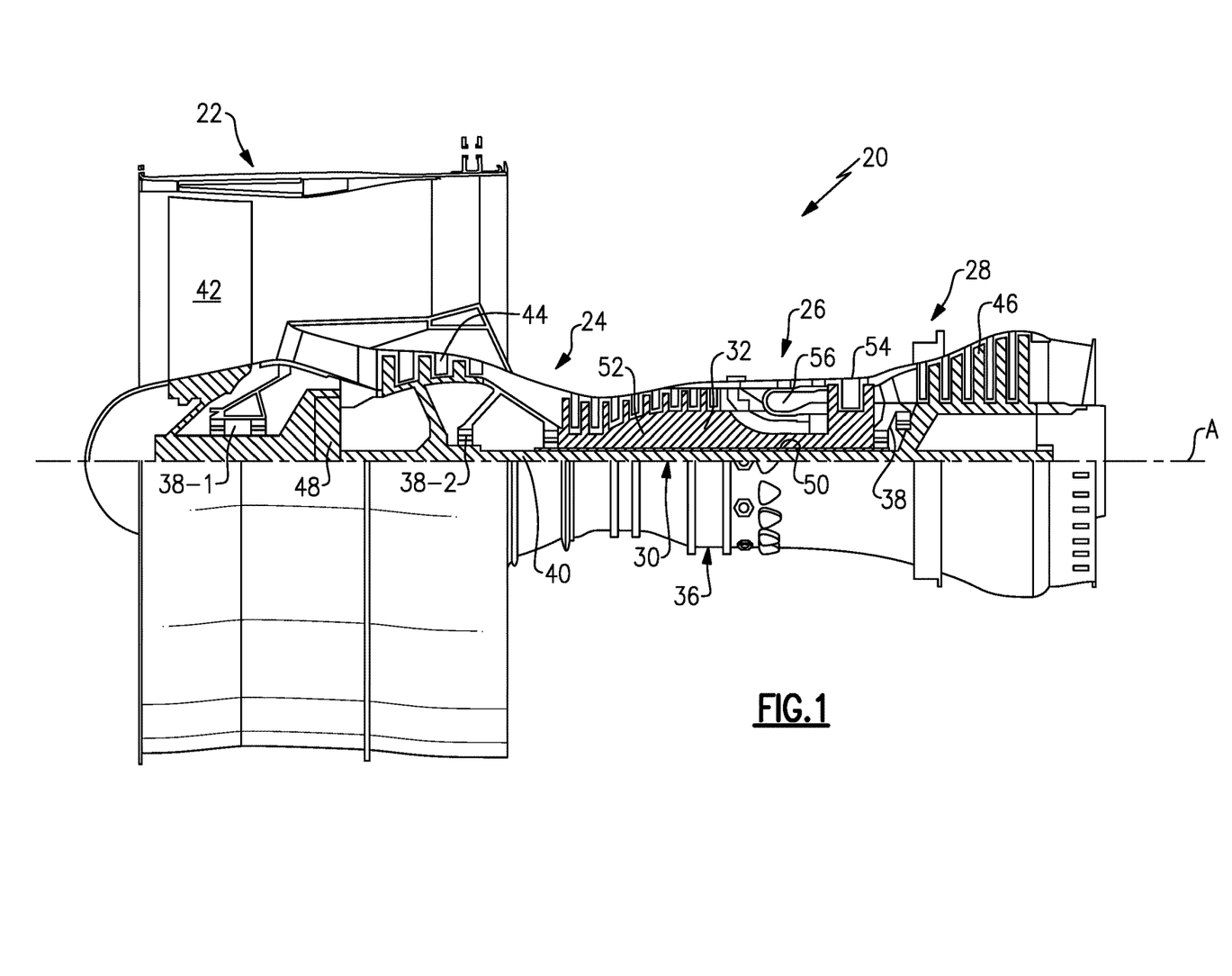
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The engine shafts 40, 50 are supported at a plurality of points by bearing structures 38 within the engine static structure 36. In one non-limiting embodiment, bearing structures 38 includes a #1 bearing structure 38-1 forward of the gearbox 72 and a #2 bearing structure 38-2 located aft of the gearbox 72.

Figure 2:
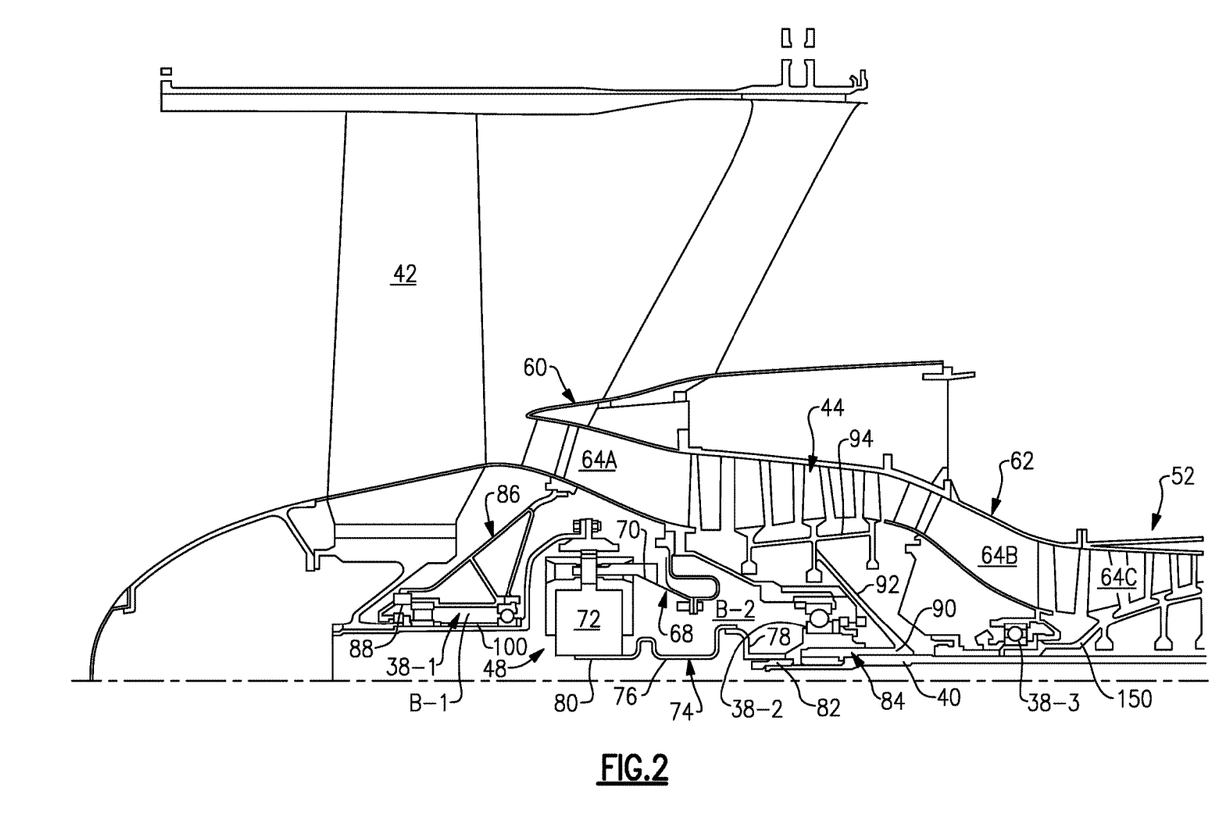
FIG. 2 is an enlarged schematic cross-section of a sectional of the gas turbine engine.

With reference to FIG. 2, the engine static structure 36 proximate the compressor section 24 generally includes a front center body case structure 60 and an intermediate case structure 62 which mounts aft of the front center body case structure 60. It should be appreciated that various case structures may alternatively or additionally be provided, yet benefit from the architecture described herein.

The front center body case structure 60 generally defines an annular core flow path 64A for the core airflow into the low pressure compressor 44. The intermediate case structure 62 defines the core flow path 64B aft of the core flow path 64A into the high pressure compressor 52 core flow path 64C. The core flow path 64B is generally radially inward of the core flow path 64A to transition into the radially smaller diameter core flow path 64C. That is, the core flow path 64B generally defines a "wasp waist" gas turbine engine architecture.

The #2 bearing structure 38-2 at least partially supports the inner shaft 40 relative to the front center body case structure 60. A #3 bearing structure 38-3 generally supports the outer shaft 50 relative the intermediate case structure 62. That is, the #2 bearing structure 38-2 at least partially supports the low spool 30 and the #3 bearing structure 38-3 at least partially supports the high spool 32. It should be appreciated that various bearing systems such as thrust bearing structures and mount arrangements will benefit herefrom.

A flex support 68 provides a flexible attachment of the geared architecture 48 within the front center body case structure 60. The flex support 68 reacts the torsional loads from the geared architecture 48 and facilitates vibration absorption as well as other support functions. A centering spring 70, which is a generally cylindrical cage-like structural component with a multiple of beams that extend between flange end structures, resiliently positions the #2 bearing structure 38-2 with respect to the low spool 30. In one embodiment, the beams are double-tapered beams arrayed circumferentially to control a radial spring rate that may be selected based on a plurality of considerations including, but not limited to, bearing loading, bearing life, rotor dynamics, and rotor deflection considerations.

The gearbox 72 of the geared architecture 48 is driven by the low spool 30 in the disclosed non-limiting embodiment through a coupling shaft 74. The coupling shaft 74 transfers torque through the #2 bearing structure 38-2 to the gearbox 72 as well as facilitates the segregation of vibrations and other transients. The coupling shaft 74 in the disclosed non-limiting embodiment includes a forward coupling shaft section 76 and an aft coupling shaft section 78. The forward coupling shaft section 76 includes an interface spline 80 which mates with the gearbox 72. An interface spline 82 of the aft coupling shaft section 78 connects the coupling shaft 74 to the low spool 30 through, in this non limiting embodiment, a low pressure compressor hub 84 of the low pressure compressor 44.

A fan rotor bearing support structure 86 aft of the fan 42 extends radially inward from the front center body case structure 60. The fan rotor bearing support structure 86 and the front center body case structure 60 define a bearing compartment B-2. It should be appreciated that various bearing structures 38 and seals 88 may be supported by the fan rotor bearing support structure 86 to contain oil and support rotation of an output shaft 100 which connects with the geared architecture 48 to drive the fan 42.

The low pressure compressor hub 84 of the low pressure compressor 44 includes a tubular hub 90 and a frustro-conical web 92. The tubular hub 90 mounts to the inner shaft 40 through, for example, a splined interface adjacent to the #2 bearing structure 38-2. The frustro-conical web 92 extends in a forwardly direction from the tubular hub 90 axially between the #2 bearing structure 38-2 and the #3 bearing structure 38-3. That is, the frustro-conical web 92 is axially located between the bearing structures 38-2, 38-3.

Figure 3:
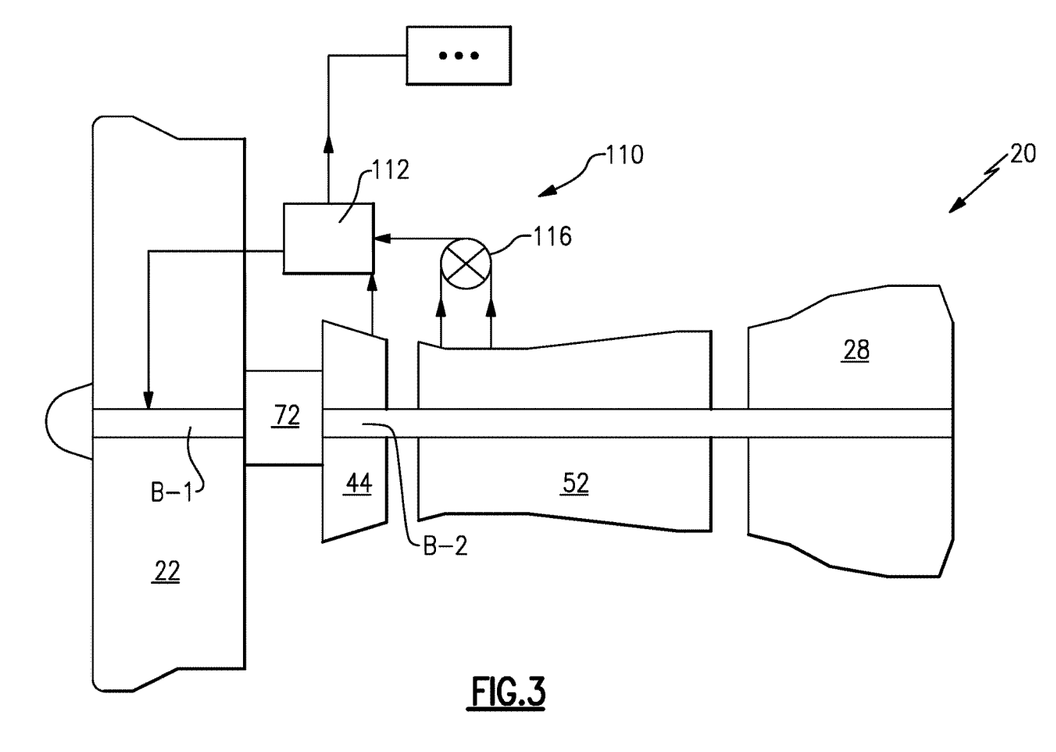
FIG. 3 is a schematic view of a gas turbine engine with a bearing compartment passage structure which bypasses around a geared architecture.

The #1 bearing structure 38-1 supports the output shaft 100 which connects the geared architecture 48 to the fan 42. The #1 bearing structure 38-1 is located within a bearing compartment B-1 that is isolated by the geared architecture 48 from bearing compartment B-2. That is, the #1 bearing compartment B-1 is isolated from the engine core aft of the geared architecture 48 and receives its buffer pressurization supply of buffer supply air through a #1 bearing compartment passage structure 110 that crosses the annular core flow path 64A for the core airflow into the low pressure compressor 44 (FIG. 3).

Figure 4:
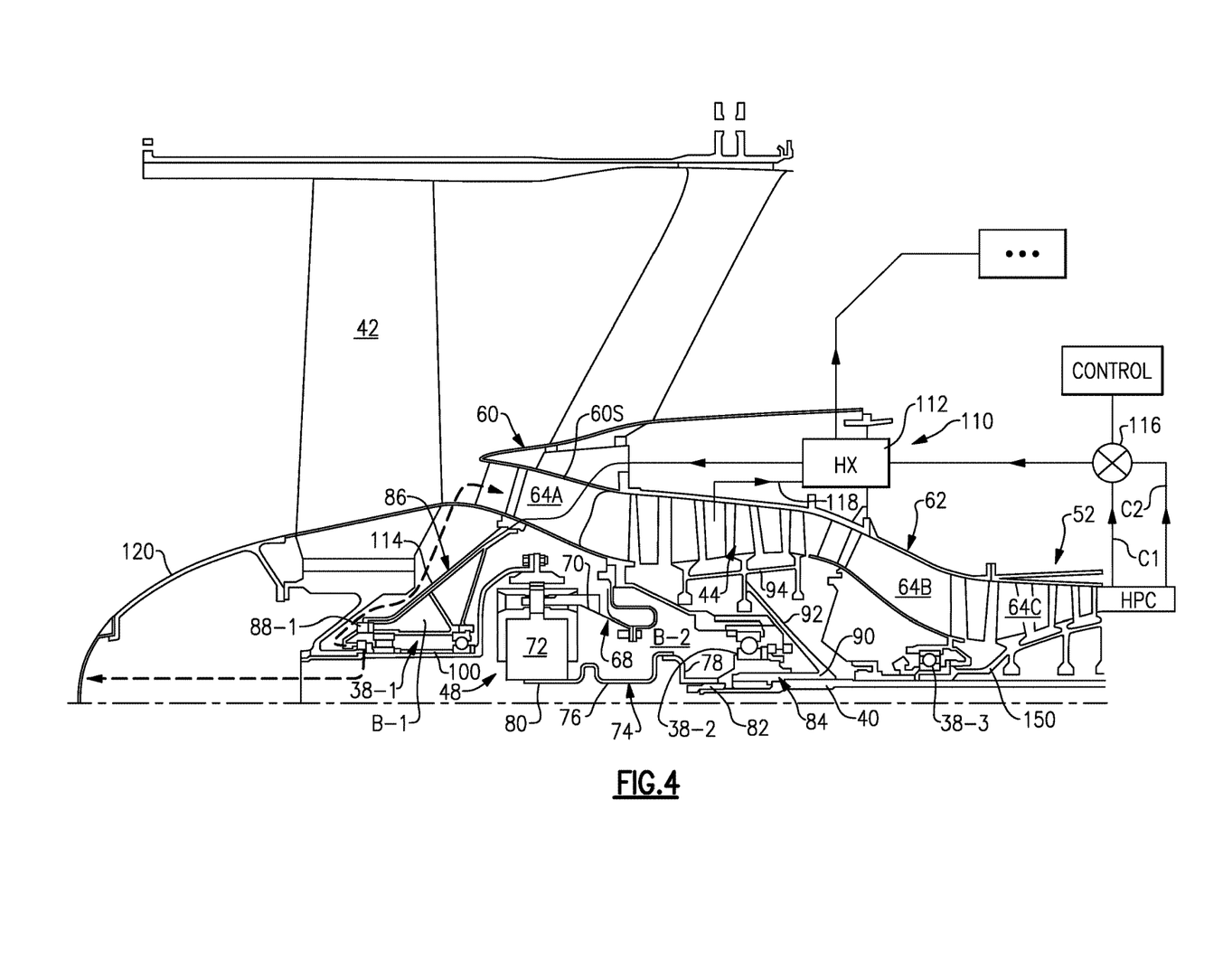
FIG. 4 is an enlarged schematic cross-section of a sectional of the gas turbine engine, which illustrates the bearing compartment passage structure.

With reference to FIG. 4, the #1 bearing compartment passage structure 110 is in communication with the core engine such as with the high pressure compressor 52 to supply a higher pressure bleed air flow of buffer supply air into the #1 bearing compartment B-1 such as the seal 88-1 to, for example, pressurize the seal 88-1 and seal lubricating fluid with respect to the #1 bearing structure 38-1. The buffer supply air may be communicated from various other sources and may pass through, for example, a conditioning device 112 such as a buffer heat exchanger. The conditioning device 112 may further condition bleed flow C1, C2 from the high pressure compressor. It should be appreciated the various bleed sources from the high pressure compressor 52 may be selected through a valve 116.

The #1 bearing compartment passage structure 110 may be at least partially defined by a hollow front center body strut 60S of the front center body case structure 60 to permit the buffer supply air to cross the annular core flow path 64A without flow interference. That is, the buffer supply air is communicated through the hollow front center body strut 60S and the core airflow passes around the hollow front center body strut 60S.

From the hollow front center body strut 60S, the buffer supply air is communicated through a passage 114 in the fan rotor bearing support structure 86 to, for example, the seal 88-1. It should be appreciated that various passages may alternatively or additionally be provided.

The passage of buffer supply air through the fan rotor bearing support structure 86 advantageously promotes heat transfer between the buffer supply air and the #1 bearing compartment B-1 to reduce buffer supply air maximum temperate at high power condition and increases buffer supply air minimum temperatures at lower power settings. As the #1 bearing structure 38-1 operates at a generally constant temperature, the #1 bearing compartment B-1 operates as a thermal ground with respect to the buffer supply air.

Downstream of the #1 bearing compartment B-1, the buffer supply air may be communicated in various manners for various usages such as toward the spinner 120 to facilitate spinner de-icing. The buffer supply air may alternatively or additionally be ejected outward aft of the fan 42 to recirculate into the annular core flow path 64A to minimize any effect upon engine efficiency.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Figure 5:
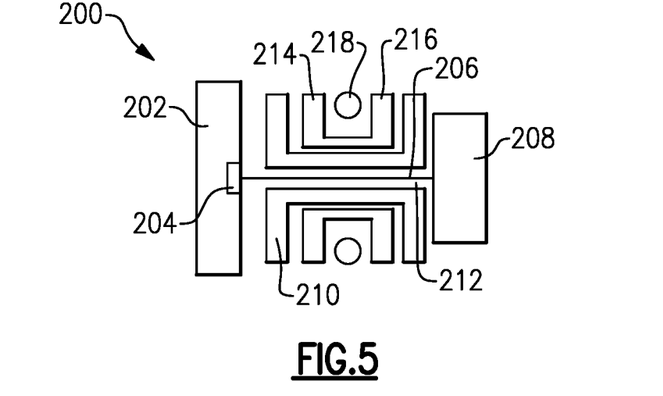
FIG. 5 shows another embodiment.

FIG. 5 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 6:
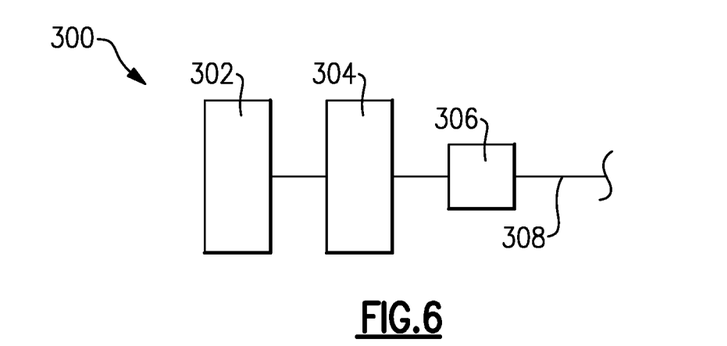
FIG. 6 shows yet another embodiment.

FIG. 6 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A gas turbine engine comprising:
a fan;
a low pressure compressor;
a high pressure compressor axially aft of said low pressure compressor;
a first case structure that defines a core flow path for core airflow into said low pressure compressor and that has a forward end and an aft end;
a second case structure that defines a core flow path for core airflow into said high pressure compressor and that is mounted to said aft end of said first case structure;
a geared architecture at least partially supported by said first case structure;
a first bearing structure mounted to said first case structure to rotationally support a fan shaft that connects with said geared architecture to drive said fan;
a flex support that provides a flexible attachment of said geared architecture within said first case structure; and
a fan drive turbine driving said geared architecture to drive said fan at a speed lower than a speed of said fan drive turbine.

2. The gas turbine engine as recited in claim 1, wherein said core flow path for core airflow into said high pressure compressor is generally radially inward of said core flow path for core airflow into said low pressure compressor.

3. The gas turbine engine as recited in claim 2, wherein said flex support reacts torsional loads from said geared architecture.

4. The gas turbine engine as recited in claim 3, wherein said flex support facilitates vibration absorption.

5. The gas turbine engine as recited in claim 4, further comprising a coupling shaft between said fan drive turbine and said geared architecture, wherein said coupling shaft transfers torque to said geared architecture and facilitates segregation of vibrations.

6. The gas turbine engine as recited in claim 4, wherein said first bearing structure is axially between said fan and said geared architecture with respect to an engine longitudinal axis.

7. The gas turbine engine as recited in claim 6, further comprising:
a bearing compartment passage structure in communication with said first bearing structure through said first case structure.

8. The gas turbine engine as recited in claim 7, wherein said first case structure includes a hollow front center body strut within said core flow path, and wherein said bearing compartment passage structure is at least partially defined by said hollow front center body strut.

9. The gas turbine engine as recited in claim 8, further comprising a fan rotor bearing support structure which at least partially supports said first bearing structure.

10. The gas turbine engine as recited in claim 9, wherein said hollow front center body strut fluidly communicates with a passage of said fan rotor bearing support structure, and said first bearing structure includes a bearing located within a first bearing compartment that rotatably supports said fan shaft.

11. The gas turbine engine as recited in claim 10, further comprising a conditioning device in communication with said bearing compartment passage structure.

12. The gas turbine engine as recited in claim 11, wherein said first bearing structure includes a seal, and said passage of said fan rotor bearing support structure supplies air to pressurize said seal.

13. The gas turbine engine as recited in claim 11, wherein said conditioning device is a heat exchanger.

14. The gas turbine engine as recited in claim 13, wherein:
said conditioning device communicates with a high pressure compressor axially aft of a low pressure compressor and said geared architecture with respect to said engine longitudinal axis, and conditions a first bleed flow and a second, different bleed flow, with said first bleed flow and said second bleed flow selected through a valve, said first bleed flow and said second bleed flow provided by said high pressure compressor.

15. The gas turbine engine as recited in claim 14, wherein said geared architecture is a planetary system, and said conditioning device is radially outboard of said low pressure compressor.

16. A gas turbine engine comprising:
a fan;
a compressor section including a high pressure compressor associated with a high spool and a low pressure compressor associated with a low spool;
a front center body case structure;
a geared architecture;
a first bearing structure mounted to said front center body case structure to rotationally support a fan shaft that connects with said geared architecture to drive said fan; and
a bearing compartment passage structure in communication with said first bearing structure through said front center body case structure;
a flex support that provides a flexible attachment of said geared architecture with respect to said front center body case structure; and
a fan drive turbine driving said geared architecture to drive said fan at a speed lower than a speed of said fan drive turbine.

17. The gas turbine engine as recited in claim 16, wherein said geared architecture is supported within said front center body case structure.

18. The gas turbine engine as recited in claim 17, further comprising a fan rotor bearing support structure which at least partially supports said first bearing structure.

19. The gas turbine engine as recited in claim 18, wherein said first bearing structure includes a bearing located within a first bearing compartment.

20. The gas turbine engine as recited in claim 19, wherein said front center body case structure includes a hollow front center body strut within a core flow path defined by said low pressure compressor, and wherein said bearing compartment passage structure is at least partially defined by said hollow front center body strut.

21. The gas turbine engine as recited in claim 20, wherein said first bearing structure is axially between said fan and said geared architecture with respect to an engine longitudinal axis.

22. The gas turbine engine as recited in claim 21, wherein said geared architecture is an epicyclic transmission.

23. The gas turbine engine as recited in claim 22, further comprising a coupling shaft connecting said fan drive turbine and said geared architecture.

24. The gas turbine engine as recited in claim 23, wherein said coupling shaft transfers torque through a second bearing structure to said geared architecture and facilitates segregation of vibrations.

25. The gas turbine engine as recited in claim 22, further comprising a second bearing structure at least partially supporting a turbine shaft driven by said fan drive turbine, and a second bearing compartment axially aft of said geared architecture with respect to said engine longitudinal axis, said first bearing compartment isolated by said geared architecture from said second bearing compartment.

26. The gas turbine engine as recited in claim 25, further comprising a centering spring positioning said second bearing structure with respect to said low spool.

27. The gas turbine engine as recited in claim 26, further comprising a conditioning device in communication with said bearing compartment passage structure, wherein said condition device is a heat exchanger.

28. The gas turbine engine as recited in claim 27, wherein said conditioning device conditions a first bleed flow and a second, different bleed flow from said high pressure compressor, with said first bleed flow and said second bleed flow selected through a valve.

\* \* \* \* \*